United States Patent [19]

Traenckner et al.

[11] 4,177,172

[45] Dec. 4, 1979

[54] AQUEOUS NITROCELLULOSE/ALKYD RESIN DISPERSION

[75] Inventors: Hans-Joachim Traenckner, Krefeld; John Goossens, Cologne; Wolfgang Kremer, Kerken; Heinz Krönke, Bomlitz, all of Fed. Rep. of Germany

[73] Assignee: Bayer Aktiengesellschaft, Fed. Rep. of Germany

[21] Appl. No.: 969,557

[22] Filed: Dec. 14, 1978

Related U.S. Application Data

[63] Continuation-in-part of Ser. No. 871,610, Jan. 23, 1978, abandoned, and a continuation-in-part of Ser. No. 871,611, Jan. 23, 1978, abandoned.

[30] Foreign Application Priority Data

Jan. 26, 1977 [DE] Fed. Rep. of Germany ....... 2702986
Jan. 26, 1977 [DE] Fed. Rep. of Germany ....... 2703075

[51] Int. Cl.² ................................................ C08L 1/18

[52] U.S. Cl. .......................................... 260/15; 260/16; 260/17 R; 428/528

[58] Field of Search .................................. 260/15, 17 R

[56] References Cited

U.S. PATENT DOCUMENTS

| 2,937,153 | 5/1960 | Rasmussen et al. | 260/15 |
|---|---|---|---|
| 3,370,025 | 2/1968 | Salo et al. | 260/15 |
| 3,450,652 | 6/1969 | Lin | 260/15 |
| 3,522,070 | 7/1970 | Webb | 260/16 |
| 3,551,367 | 12/1970 | Gasper et al. | 260/16 |
| 3,615,792 | 10/1971 | Keene | 260/16 |

*Primary Examiner*—Edward M. Woodberry
*Attorney, Agent, or Firm*—Connolly and Hutz

[57] ABSTRACT

Aqueous dispersion of a binder for coating compositions comprising 5–35% by weight of nitrocellulose, 0–30% by weight, based on (a) of plasticizer, 5–50% by weight of alkyd resin, 30–80% by weight of water, 0.5–10% by weight of emulsifier, and optionally 4–40% by weight of a urea resin and/or melamine resin.

5 Claims, No Drawings

AQUEOUS NITROCELLULOSE/ALKYD RESIN DISPERSION

This application is a continuation-in-part of our applications Ser. Nos. 871,610 and 871,611, filed Jan. 23, 1978, now abandoned.

Aqueous coating compositions, for example for lacquering furniture, have hitherto generally contained synthetic resins, such as acrylic polymers or cellulose esters, as the film-forming agents. Methods for preparing aqueous emulsions of suitable cellulose derivatives are known and are described, for example, in German Auslegeschrift No. 1,286,672 and U.S. Pat. No. 3,615,792. Emulsions of cellulose esters, for example of nitrocellulose, cannot be used as the sole binders for coating compositions because they only produce brittle and fragile films. They must be combined with ketone resins or vinyl acetate copolymers in order to achieve glossy coatings with good mechanical properties.

Nitrocellulose, usually combined with alkyd resins, is used for lacquering wood or similar materials. This combination leads to coatings of high gloss, adequate hardness, good elasticity and excellent flow, if processed from organic solutions. All attempts hitherto to emulsify alkyl resins and nitrocellulose lead either to emulsions of inadequate stability or to emulsions with particles which are too coarse and which do not permit levelling to give glossy coatings. The invention relates to an aqueous dispersion of a binder for coating compositions said dispersion comprising (a) 5–35% by weight of nitrocellulose,
(b) 0–30% by weight, based on (a), of plasticizer for (a),
(c) 5–50% by weight of alkyd resin having an oil content of 5–50% by weight, based on alkyd resin,
(d) 30–80% by weight of water, and
(e) 0.5–10% by weight of emulsifier, the percentages of a, c, d, and e being based on the sum of components (a) to (e), in which the emulsifier is a member of the group consisting of (i) a partially saponified polyvinyl acetate having a degree of hydrolysis of 70–97, preferably 80–92, in particular 86–89%,
(ii) a polyvinylpyrrolidone, and
(iii) a hydrolyzed vinyl acetate/vinyl pyrrolidone copolymer, the particle size of the dispersed phase being from 0.1 to 1.5$\mu$, preferably from 0.1 to 0.5$\mu$.

The dispersions are stable and can give coatings of substantially faultless gloss.

The invention further relates to a process for the preparation of such dispersions of a binder for coating compositions, which is characterized in that nitrocellulose an alkyd resin and a plasticizer for the nitrocellulose are dissolved in an organic solvent, this solution is dispersed into a solution consisting of emulsifier and water and the organic solvent is removed by distillation.

The size of the dispersed particles is particularly important for the stability of the dispersion and also for its behavior in film formation. According to the invention it is preferably 0.1 to 0.5$\mu$ and it does not change substantially even on prolonged storage at 5°–50° C. The particle size can be identified by laser correlation spectroscopy.

Preferred nitrocellulose in accordance with the invention are the customary collodion cotton qualities, in particular cellulose nitric acid esters having a nitrogen content of 10.2 to 12.4% by weight.

Preferred plasticizers within the meaning of the invention are, in particular, phthalic and adipic esters of alcohols having from 4 to 8 carbon atoms, such as hexyl phthalate, dioctyl phthalate, dibutyl adipate, dioctyl hexyl phthalate, dioctyl phthalate, adipate, dioctyl adipate, phosphoric acid esters of alcohols having from 6 to 10 carbon atoms such as tricresyl phosphate, triphenyl phosphate, trioctyl phosphate, cresylphenyl phosphate or dioctylphenyl phosphate, and also diethyleneglycol monolaurate, dipentaerythritol hexapropionate, 2-methoxyethylacetyl tributyl aconitate, butoxy-ethyldiglycol carbonate, acetyltributyl citrate, triethyleneglycol pelargonate, butyldiglycol carbonate, polyethyleneglycol di-2-ethylhexoate, triethyleneglycol di-2-ethylbutyrate, tributylcarballylate, dibutyl sebacate or benzenesulphonic acid N-methylamide.

By "alkyd resins" there are to be understood in the following fatty acid-modified or oil-modified polyesters.

By alkyd resins and polyesters there are to be understood polycondensates produced by polycondensation of alcohols and carboxylic acids according to known methods of the kind defined in Römpp's Chemielexikon, Vol. 1, page 202, Franckh'sche Verlagsbuchhandlung Stuttgart, 1966 or in Ullmann's Enzyklopädie der Technischen Chemie (Ullmann's Encyclopaedia of Industrial Chemistry) or are described, for example, by D. H. Solomon, The Chemistry of Organic Film Formers, pages 75–101, J. Wiley & Sons Inc., New York 1967.

Preferred alcohols for the preparation of the alkyd resins are aliphatic, cycloaliphatic and/or aromatic alcohols containing 1 to 15, preferably 2 to 6, carbon atoms and 1 to 6, preferably 1 to 4 hydroxyl groups attached to non-aromatic carbon atoms, e.g. glycols such as ethylene glycol, propane-1.2-diol, propane-1.3-diol, butane-1.2-diol, butane-1.3-diol, butane-1.4-diol, 2-ethylpropane-1.3-diol, 2-ethylhexane-1.3-diol, neopentylglycol, hexane-1.6-diol, cyclohexane-1.2-diol, cyclohexane-1.4-diol, 1.2-bis-(hydroxymethyl)-cyclohexane, 1.4-bis-(hydroxymethyl)-cyclohexane, adipic acid bis-(ethylene glycol ester); ether alcohols such as diethylene glycol, triethylene glycol, dipropylene glycol; oxethylated bisphenols, perhydrogenated bisphenols; 1.2.4-butanetriol, 1.2.6-hexane-triol, trimethylolethane, trimethylolpropane, glycerol, pentaerythritol, dipentaerythritol, mannitol and sorbitol; chain-terminating monohydric alcohols having 1 to 6 carbon atoms such as propanol, butanol, cyclohexanol and benzyl alcohol.

The most customary alcohols are glycerol, trimethylolpropane, neopentylglycol and pentaerythritol.

Preferred acid components for the preparation of the alkyd resins are aliphatic cycloaliphatic saturated or unsaturated and/or aromatic polybasis carboxylic acids, preferably di-, tri- and tetrabasic carboxylic acids containing 2 to 14, preferably 4 to 12, carbon atoms per molecule and the esterificable derivatives thereof (e.g. anhydrides or esters), e.g. phthalic acid anhydride, isophthalic acid, terephthalic acid, tetrahydro and hexahydrophthalic acid anhydride, endomethylenetetrahydrophthalic acid, succinic acid, adipic acid, sebacic acid, trimellitic acid, pyromellitic acid anhydride, and maleic acid anhydride. Phthalic acid anhydride is the most customary.

Preferred monocarboxylic acid suitable as chain-terminating agents for the preparation of the alkyd resins are aliphatic, cycloaliphatic saturated and unsaturated and/or aromatic monocarboxylic acids containing 6 to 24 carbon atoms per molecule such as benzoic acid, p-tert.-butylbenzoic acid, tolyl acid, hexahydrobenzoic acid, abietic acid, lactic acid as well as synthetic fatty acids, animal and vegetable oils, fats or fatty acids and esters thereof such as olive oil, linseed oil, soya bean oil, wood oil, safflower oil, dehydrated castor oil and castor oil, cotton seed oil, groundnut oil, tall oil fatty acids, linseed oil, fatty acid, safflower oil fatty acids, the fatty acids of soya bean oil, of wood oil, of safflower oil and of castor oil and dehydrated castor oil, monounsaturated fatty acids, lard, tallow and train oils, and products obtained from natural unsaturated oils or fatty acids by conjugation or isomerization. Preferred saturated fatty acids are, for example, coconut oil and α-ethylhexanoic acid.

In the alkyd resins which are employed for the coating dispersions according to the invention, the proportion of oil can be 5 to 50%, preferably 20 to 45%, by weight, calculated as triglyceride and relative to the alkyd resin.

The molecular weight determined as number average of the alkyd resins is 2000 to 10.000 (molecular weights below 5000 determined by vapor pressure osmosis in dioxane and acetone; if both values differ from each other, the lower value is considered to be the more accurate one; molecular weights above 5000 determined by membrane osmosis in acetone).

The alkyd resins are prepared according to known methods by condensation. The starting materials are usually reacted at temperatures of 140° to 250° C. in an inert gas atmosphere, e.g. nitrogen, with the splitting-off of water until the desired acid number has been reached.

These alkyd resins can optionally be mixed with other components, for example, also with oil-free polyesters.

Preferred emulsifiers are polyvinyl alcohols which are formed by hydrolysis of polyvinyl acetate and which are available commercially, for example under the designation Polyviol W 25/240 and W 25/140 by Messrs. Wacker-Chemie GmbH, Munich.

The polyvinylpyrrolidones used as emulsifiers generally have a K-value of from 25 to 100, determined as described in the informational leaflet "Luviskol ®K" of Messrs. BASF AG, Ludwigshafen, of November 1974.

The vinyl acetate/vinyl pyrrolidone copolymers used as emulsifiers generally have a pyrrolidone content of 50 mol-% and a K-value of from 20 to 40, determined as described in the informational leaflet "Luviskol ®VA" of Messrs. BASF AG, Ludwigshafen, of March 1976.

The polyvinyl alcohol emulsifiers generally have molecular weights from 5,000 to 100,000, preferably 10,000 to 50,000, in particular 25.000 to 40,000, determined as number average by gel permeation chromatography as described by L. K. Koopal in Communications Agriculture University Wageningen, The Netherlands 78/12 (1978).

The aqueous dispersions according to the invention can be produced by dissolving the alkyd resin, the nitrocellulose and the plasticizer in a polar solvent which is not soluble in water, and which can be removed by distillation from the emulsion to be formed, combining the solution with an aqueous solution of the emulsifier and thus forming an oil-in-water emulsion by means of high shearing forces. The organic solvent is then removed by distillation, on its own or in the form of an aqueous azeotrope. Solvents which are particularly suitable are alkyl acetates and alkyl propionates. The aqueous dispersion according to the invention which remains can be diluted with more water and/or a suitable coalescing agent can be added to it; the dispersions of the invention are starting materials for the preparation of lacquers which can be produced by the addition of water, coalescing agents, dyestuffs, pigments and other auxiliaries. In the following this lacquer will be designated a secondary emulsion.

One or more coalescing or aggregating agents can be added to the dispersion in order to achieve a clear film of high gloss. Coalescing agents which form an azeotrope with water are preferred. It is then necessary to add to the dispersion sufficient coalescing agent so that the azeotrope is first distilled off and, in addition, to add further coalescing agent which effects the aggregation of the particles. Possible coalescing agents are ethylene glycol monomethyl ether, ethylene glycol monoethyl ether and ether-acetate, diethylene glycol, diethylene glycol monobutyl ether, diacetone alcohol, methylglycol acetate, methyl amyl ketone and diisobutyl ketone.

The primary emulsion consisting of cellulose ester, alkyd resin, emulsifier, plasticizer, water and organic solvent can be produced in a commercially available device having an adequate high peripheral speed of 5 to 50 m/second, preferably 10–30 m/second.

Examples are: Ultra-Turrax type 45 of 10,000 revolutions per minute; Gaulin homogenizer, dissolver and bead mills.

The emulsification time with the Ultra-Turrax is generally one to several minutes depending of the total amounts of constituents to be emulsified. This time is adequate to produce small, spherical particles of 0.1–1.5, preferably 0.1–0.5μ from the constituents of the ultimate emulsion.

In a preferred embodiment, the aqueous dispersions of the invention contain additionally 4–40% by weight, based on components (a) to (e), of a urea and/or melamine resin.

In the sense of the invention, urea resins and melamine resins are condensation products of, respectively, urea or melamine with formaldehyde which can, for example, be prepared in an alkaline medium. These products are known from the literature; see "Methoden der Organischen Chemie" (Methods of Organic Chemistry) (Houben-Weyl), Vol. 14/2, part 2, 4th edition, Georg-Thieme Verlag, Stuttgart 1963, pages 319–371. They are generally water-soluble and are added in the form of aqueous solutions to the dispersions of the invention. They cause cross-linking of the coatings prepared from the dispersions and thus improve the stability and gloss of the coatings. Catalytic amounts of p-toluenesulphonic acid can be added in order to accelerate the crosslinking.

It may sometimes be advantageous to use additionally anionic and optionally non-ionic surfactants in amounts of 0.1 to 1% by weight, calculated on the sum of alkyd resin and nitrocellulose. It might, however, often lead to a decrease in storage stability.

The invention was particularly surprising because a polyvinylalcohol (having a degree of hydrolysis of 98%) is not suitable for emulsifying the nitrocellulose/alkyd resin binder. In contrast thereto, a partially saponified polyvinyl acetate having a degree of hydrolysis of 88% is excellently suitable as an emulsifier for the binder.

The invention is the more surprising, since the partially saponified polyvinyl acetate is not suitable for emulsifying nitrocellulose in water, if not admixed with an alkyd resin, at solid contents of the dispersion which are appropriate for industrial application.

It is an advantage of the dispersions of the invention that a relatively low amount of organic solvents is needed. Furthermore the dispersions of the invention yield coatings having a better water resistance, and the lacquers based on said dispersions can be processed without producing undesired foaming. The coatings prepared from dispersions of the inventions have nearly the same high gloss as those of the prior art.

It is known from U.S. Pat. No. 3,522,070 that it is possible to prepare dispersions with a submicron particle size by means of anionic emulsifiers either alone or mixed with up to about an equal quantity or more of non-ionic emulsifiers. Among the example, a partially saponified polyvinyl acetate having a particular degree of hydrolysis is not mentioned. These dispersions have, however, one or more of the disadvantages described on page 2.

Surprisingly it has been discovered according to the present invention that by admixing polymeric emulsifiers of the polyvinyl alcohol type—but only within a limited range of hydroxyl content—and/or of the polyvinyl pyrolidone type dispersions having very finely divided particles, being extremely storage-stable and hardly foaming are obtained. According to our invention, less solvent is needed to prepare dispersions having the same solid content and particle size as the dispersions of the prior art.

This phenomenon appears particularly surprising since with the emulsifiers of U.S. Pat. No. 3,522,070 these properties cannot be obtained at the same time. The particle size referred to in this specification is the average diameter of the particles.

EXAMPLES

In the following parts are parts by weight and % are % by weight.

EXAMPLE A

A solution in ethyl acetate was prepared from 100 g of nitrocellulose chips containing approximately 12% of nitrogen, Standard Specification 24 E in accordance with DIN 53,179, consisting of 82% of collodion cotton and 18% of dibutyl phthalate,
100 g of groundnut oil fatty acid alkyd resin having an oil content of 41%, and
300 g of ethyl acetate.

After stirring slowly for approximately 3 hours a clear solution was obtained which was combined with 300 g of a 3% strength aqueous solution of a partially saponified polyvinyl acetate (molecular weight 40,000, degree of hydrolysis 86-89%), whilst stirring slowly. The mixture was then dispersed for 2 minutes in an Ultra-Turrax type 45 laboratory disperser by raising the speed of rotation continuously to 10,000 revolutions per minute. The solvent was distilled off under reduced pressure. A primary emulsion having a solids content of 41.8% and a viscosity corresponding to a flow time of 34 seconds in the DIN cup No. 4 (DIN 53,211) was thus obtained.

EXAMPLE B (comparison)

A dispersion was prepared as described in Example A, except that instead of the partially saponified polyvinyl acetate, 300 g of an aqueous solution of a non-ionic fatty acid ester (emulsifier Emulphor EL of BASF) were used. This gave an emulsion which was stable for a max. of 3-5 hours and which had an average particle size of 13μ in a determination of particle pattern.

EXAMPLE C

A dispersion was prepared from
100 g of groundnut oil fatty acid alkyd resin having an oil content of 41%,
100 g of nitrocellulose chips as in Example A and
300 g of ethyl acetate.

After stirring for 3 hours, a clear solution was obtained which was combined with 500 g of a 2.5% strength solution of a partially saponified polyvinyl acetate (molecular weight 80,000, degree of hydrolysis 86-89%) in water. The procedure described under Example A was then followed. A primary emulsion with a solids content of approximately 30% and a flow viscosity of 28 seconds in the DIN cup No. 4 was then obtained.

USE EXAMPLES

EXAMPLE 1 (comparison test)

A lacquer of the following composition was prepared:

| | |
|---|---|
| Groundnut oil fatty acid alkyd resin with 41% of oil, 60% strength solution in xylene: | 152 parts |
| Collodion cotton (cellulose nitric acid ester containing approximately 12% of nitrogen), Standard Specification type 24 E, DIN 53,179, in the form of chips | 111 parts |
| Dibutyl phthalate | 8 parts |
| Ethylene glycol monoethyl ether | 59 parts |
| Butyl acetate | 190 parts |
| Ethyl acetate | 140 parts |
| Xylene | 300 parts |
| Ethylglycol acetate | 40 parts |

The resulting lacquer exhibited a viscosity corresponding to a flow time of approximately 30 seconds, measured in accordance with DIN 53,211 (DIN cup No. 4). The curing to give films and the assessment are described in Table 1.

EXAMPLE 2

A dispersion of the following composition was prepared:

| | |
|---|---|
| Dispersion from Example A, 41.8% strength in water | 550 parts |
| Dibutyl phthalate | 10 parts |
| Ethylene glycol monomethyl ether | 124 parts |
| Ethylglycol acetate | 44 parts |
| 4-Methyl-4-hydroxypentan-2-one | 32 parts |
| Water | 234 parts |
| Levelling agent (alkylbenzenesulphonate) | 6 parts |

The resulting dispersion exhibited a viscosity corresponding to a flow time of approximately 15 seconds, measured in accordance with DIN 53,211, DIN-cup 4.

EXAMPLE 3

A lacquer of the following composition was prepared:

| | |
|---|---|
| dispersion from Example A, 41.8% strength in water | 580 parts |
| Ethylene glycol monoethyl ether | 34 parts |
| Ethylglycol acetate | 34 parts |
| Ethylene glycol monomethyl ether | 34 parts |
| Methylglycol acetate | 34 parts |
| 4-methyl-4-hydroxy-pentan-2-one | 34 parts |
| Resimene 980X[1] | 70 parts |
| water | 174 parts |
| Levelling agent (alkylbenzene-sulphonate) | 6 parts |
| para-toluenesulphonic acid, 25% strength solution in water | 17 parts |

[1] methylated, non-plasticized water-soluble urea resin from Messrs. Monsanto.

Table

| | Example 1 (Comparison) | Example 2 | Example 3 |
|---|---|---|---|
| Drying until free from tackiness, in minutes | 30 | 35 | 35 |
| Pendulum hardness by Albert-Koenig, method DIN 53,157 | | | |
| after 1 hour | 80 seconds | 30 seconds | 35 seconds |
| 3 hours | 102 seconds | 78 seconds | 80 seconds |
| 5 hours | 112 seconds | 100 seconds | 105 seconds |
| 24 hours | 116 seconds | 114 seconds | 150 seconds |
| Resistance to water[1] | 0 | 1/2 | 1/0 |
| Resistance to alcohol[2] | 0/1 | 4 | 1/10 |
| Gloss by Gardner's method (60°) | 88 | 82 | 74 |
| Acceptance of top coat after storage at 50° C. with lacquer according to Example 1 | No result after 25 days | No result after 25 days | |
| Service life, in hours | Unlimited | Unlimited | 96 hours |

[1] The test is carried out, after storing the specimen sheet at 20° C. for one week, by exposing it to cottonwool wadding impregnated with water. Time of exposure: 8 hours.
[2] Corresponding to 1, but 50% strength aqueous ethyl alcohol solution instead of water.

We claim:

1. An aqueous dispersion of a binder for coating compositions said dispersion comprising
    (a) 5–50% by weight of nitrocellulose,
    (b) 5–30% by weight, based on (a), of plasticizer for (a),
    (c) 5–50% by weight of alkyd resin having an oil content of 5–50% by weight, based on alkyd resin,
    (d) 30–80% by weight of water, and
    (e) 0.5–10% by weight of emulsifier, the percentages of a, c, d and e being based on the sum of components (a) to (e), in which the emulsifier is a member of the group consisting of
    (i) a partially saponified polyvinyl acetate having a degree of hydrolysis of 70–97%,
    (ii) a polyvinyl pyrrolidone, and
    (iii) a hydrolyzed vinyl acetate/vinyl pyrrolidone copolymer, the particle size of the dispersed phase being from 0.1 to 1.5μ.

2. An aqueous disperson according to claim 1, containing additionally 4–40% by weight based on components (a) to (e), of a urea and/or melamine resin.

3. An aqueous dispersion according to claim 1, in which the alkyd resin contains 20 to 45% by weight of oil.

4. An aqueous dispersion according to claim 1, in which the dispersed particles have an average size from 0.1 to 0.5μ.

5. A process for the production of an aqueous dispersion according to claim 1, characterized in that nitrocellulose, alkyd resin and—optionally—plasticizer are dissolved in an organic solvent, preferably at room temperature, the alkyd resin and the nitrocellulose amounting to at least 30% by weight of the solution, and this obtained solution is subsequently dispersed into an aqueous solution of the emulsifer, this emulsifier solution amounting to at least one half by weight of the alkyd resin/nitrocellulose/plasticizer solution, and the organic solvent is removed by distillation.

* * * * *